US012607912B2

(12) United States Patent
Ting et al.

(10) Patent No.: US 12,607,912 B2
(45) Date of Patent: Apr. 21, 2026

(54) CAMERA MODULE

(71) Applicant: PRIMAX ELECTRONICS LTD.,
Taipei City (TW)

(72) Inventors: Kuan-Pao Ting, Taipei City (TW);
Chin-Chuan Wu, Taipei City (TW);
Tai-Ying Wu, Taipei City (TW)

(73) Assignee: PRIMAX ELECTRONICS LTD.,
Taipei City (TW)

( * ) Notice: Subject to any disclaimer, the term of this
patent is extended or adjusted under 35
U.S.C. 154(b) by 267 days.

(21) Appl. No.: 18/594,023

(22) Filed: Mar. 4, 2024

(65) Prior Publication Data

US 2025/0244642 A1     Jul. 31, 2025

(30) Foreign Application Priority Data

Jan. 26, 2024    (TW) ................................. 113103188

(51) Int. Cl.
*G03B 17/55* (2021.01)
*G02B 7/02* (2021.01)
*G03B 30/00* (2021.01)

(52) U.S. Cl.
CPC ............. *G03B 17/55* (2013.01); *G02B 7/028*
(2013.01); *G03B 30/00* (2021.01)

(58) Field of Classification Search
None
See application file for complete search history.

(56) References Cited

U.S. PATENT DOCUMENTS

| | | | | |
|---|---|---|---|---|
| 2006/0108352 A1* | 5/2006 | Fernandez | .............. | B60S 1/026 |
| | | | | 348/E5.026 |
| 2019/0137723 A1* | 5/2019 | Bernal | .................... | H04N 23/55 |
| 2021/0103120 A1* | 4/2021 | Lee | ......................... | G02B 13/16 |
| 2021/0199953 A1* | 7/2021 | Hong | ..................... | G02B 7/026 |
| 2021/0294066 A1* | 9/2021 | Hirata | ..................... | G02B 7/028 |
| 2021/0325765 A1* | 10/2021 | Liu | ......................... | G03B 30/00 |
| 2022/0089102 A1* | 3/2022 | Sauer | ..................... | H04N 23/52 |
| 2022/0163751 A1* | 5/2022 | Park | ......................... | G02B 7/028 |
| 2023/0039292 A1* | 2/2023 | Kobayashi | ............. | G03B 15/00 |
| 2024/0361499 A1* | 10/2024 | Hsu | ......................... | G02B 7/028 |
| 2025/0321468 A1* | 10/2025 | Ting | ......................... | G03B 17/12 |

FOREIGN PATENT DOCUMENTS

CN              214375759 U   * 10/2021

* cited by examiner

*Primary Examiner* — Derek S. Chapel
(74) *Attorney, Agent, or Firm* — WPAT, PC

(57) ABSTRACT

A camera module includes a lens barrel, a front housing, a
circuit board, a lens module and a heating module. The lens
barrel has first and second portions. The front housing
accommodates the second portion. The circuit board is
adjacent to the front housing and has a control element. The
lens module is disposed in the lens barrel and has a front
lens. The heating module is disposed in the lens barrel. The
heating module includes: an electrical connector, disposed in
the first portion and covered by the front housing and
electrically connected to the control element; a heating
element, in contact with the front lens and electrically
connected to the control element; and a temperature sensor,
close to the front lens and electrically connected to the
control element. The temperature sensor is configured to
measure a temperature close to the front lens.

10 Claims, 5 Drawing Sheets

150

152

156

154

CAMERA MODULE

FIELD OF THE INVENTION

The present disclosure relates to a camera module, and in particular, to a camera module that can automatically heat a front lens.

BACKGROUND OF THE INVENTION

Although some current camera modules are equipped with heaters, the heaters must be turned on manually. In addition, those are not waterproof, so the current camera modules still need to be improved.

SUMMARY OF THE INVENTION

The present invention provides a camera module, which includes a lens barrel, a front housing, a circuit board, a lens module and a heating module. The lens barrel has a first portion and a second portion connected to the first portion. The front housing accommodates the second portion of the lens barrel. The circuit board is adjacent to the front housing and has a control element. The lens module is disposed in the lens barrel and has a front lens. The heating module is disposed in the lens barrel, in which the heating module includes: an electrical connector, disposed in the first portion of the lens barrel and covered by the front housing and electrically connected to the control element of the circuit board; a heating element, in contact with the front lens of the lens module and electrically connected to the control element of the circuit board through the electrical connector; and a temperature sensor, close to the front lens of the lens module and electrically connected to the control element of the circuit board through the electrical connector, in which the temperature sensor is configured to measure a temperature close to the front lens, and the control element turns on the heating element when the temperature is lower than a set temperature.

In some embodiments of the present disclosure, the first portion of the lens barrel has a first through hole, and the electrical connector passes through the first through hole.

In some embodiments of the present disclosure, the front housing has a second through hole, and the electrical connector passes through the second through hole to electrically connect the control element of the circuit board.

In some embodiments of the present disclosure, the control element is disposed on a surface of the circuit board away from the lens module, and the circuit board has a third through hole, and the electrical connector passes through the third through hole to electrically connect the control element of the circuit board.

In some embodiments of the present disclosure, the control element is a microcontroller unit (MCU).

In some embodiments of the present disclosure, the electrical connector is a flexible circuit board.

In some embodiments of the present disclosure, the heating element is a ring-shaped heating element disposed on a front surface, a rear surface and/or a side surface of the front lens of the lens module and/or in a groove of the front lens of the lens module.

In some embodiments of the present disclosure, the heating element is an electric heating circuit.

In some embodiments of the present disclosure, the temperature sensor is a thermistor.

In some embodiments of the present disclosure, the camera module further includes: a first sealing element, disposed between the first portion of the lens barrel and the front housing.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
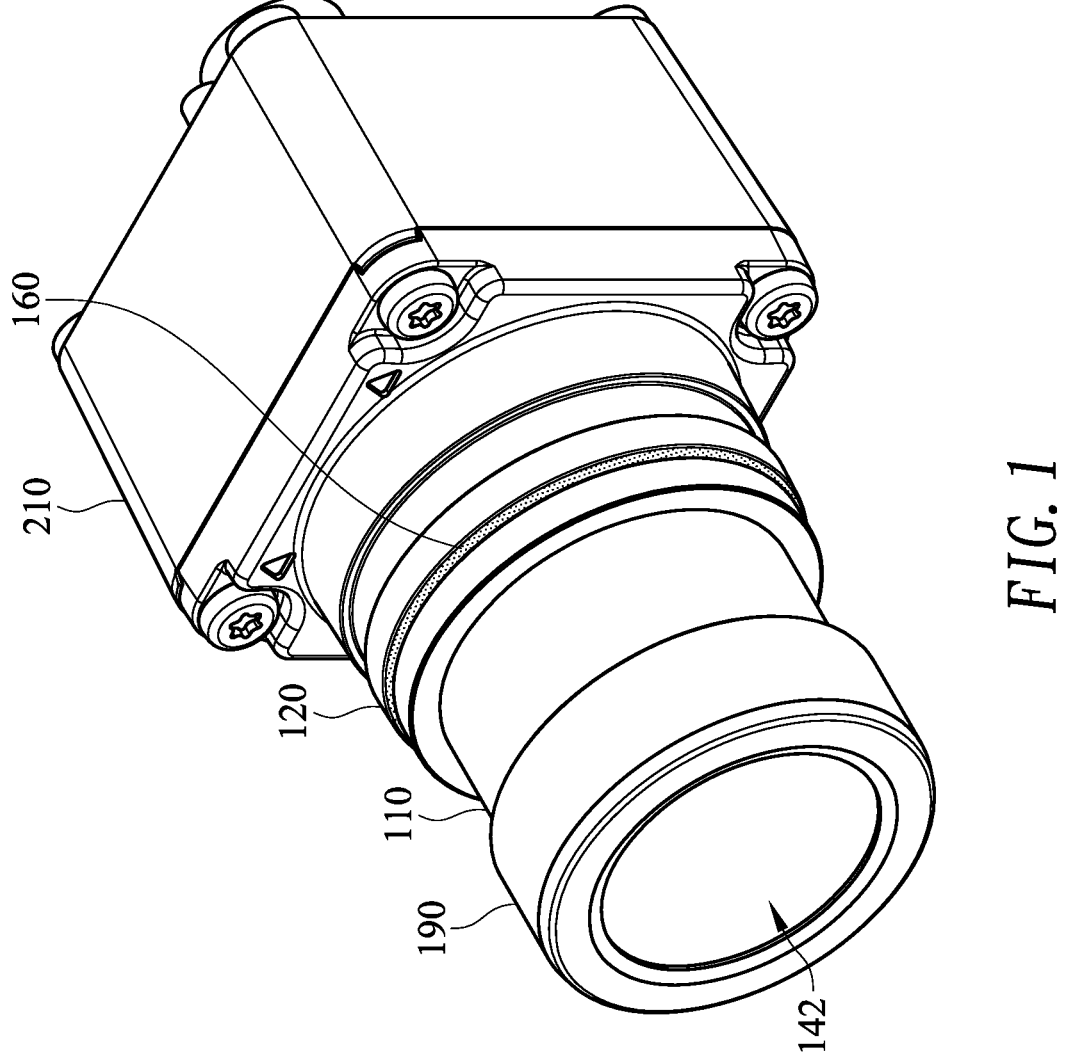
FIG. 1 is a three-dimensional view of a camera module according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, although some current camera modules are equipped with heaters, the heaters must be turned on manually. In addition, those are not waterproof, so the current camera modules still need to be improved. Accordingly, the present invention provides a camera module, which includes a lens barrel, a front housing, a circuit board, a lens module and a heating module (including an electrical connector, a heating element and a temperature sensor), which can sense a temperature close to a front lens of the lens module, and has automatic heating function and good waterproof performance, so it can be applied to an advanced driver assistance system (ADAS), such as a Level 5 Society of Automotive Engineers (SAE) vehicle.

Specifically, the temperature sensor of the heating module can sense the temperature near the front lens of the lens module; the temperature sensor is electrically connected to the control element, so when the sensed temperature is lower than a set temperature, the controller can turn on the heating element to perform automatic heating function without having to manually turn it on; the heating module is entirely disposed in the lens barrel, and no part thereof is exposed to the outside of the lens barrel, so the camera module has good waterproof performance. Various embodiments of the camera module of the present invention will be described in detail below.

Figure 2:
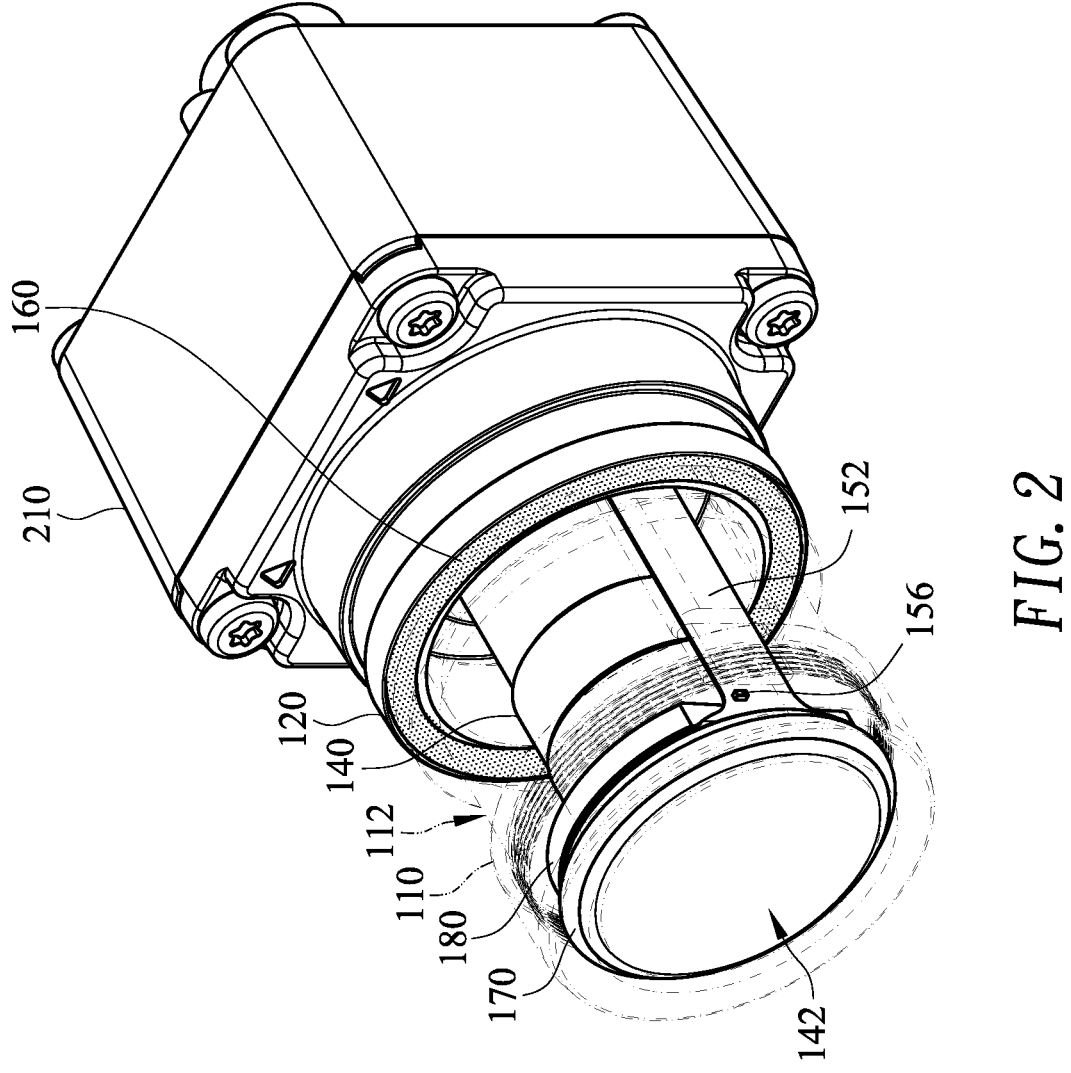
FIG. 2 is a three-dimensional view of a camera module (a lens barrel is shown in perspective) according to an embodiment of the present invention.
Figure 3:
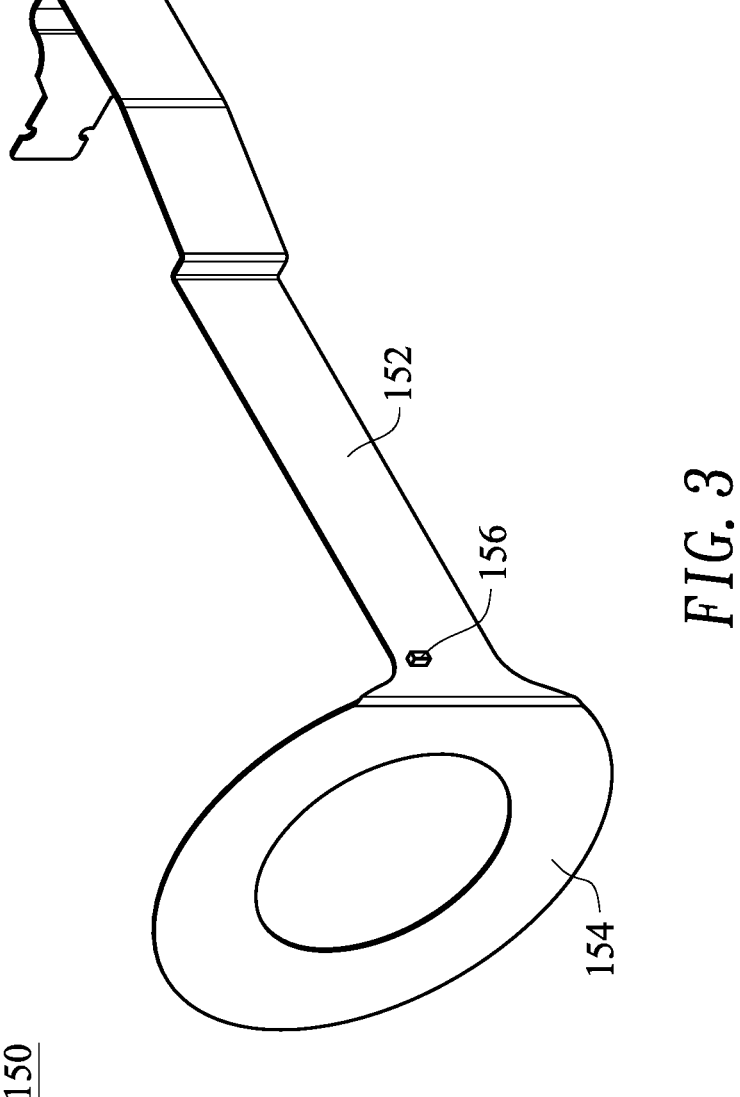
FIG. 3 is a three-dimensional view of a heating module according to an embodiment of the present invention.
Figure 4:
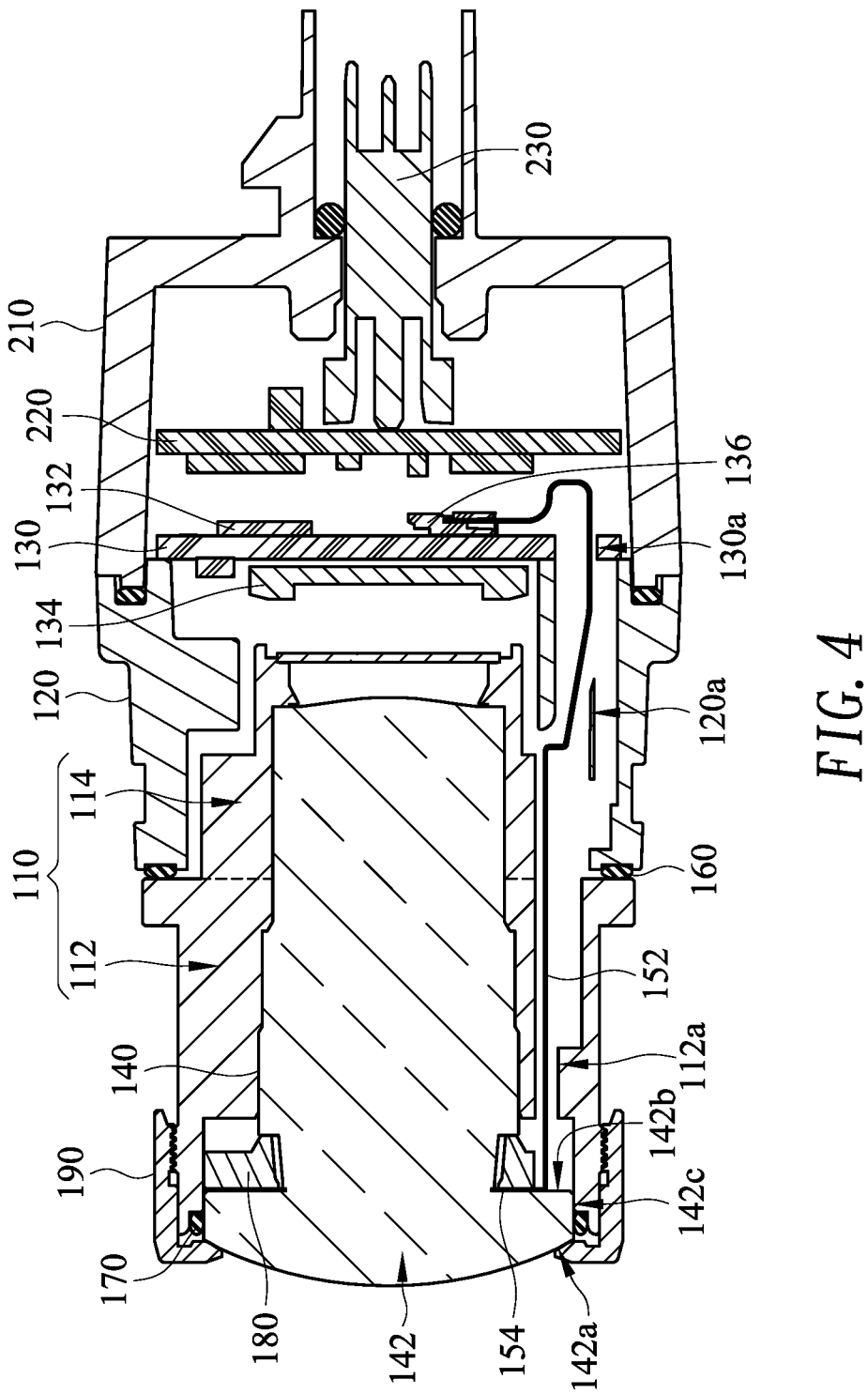
FIG. 4 is a cross-sectional view of a camera module according to an embodiment of the present invention.

FIG. 1 is a three-dimensional view of a camera module according to an embodiment of the present invention. FIG. 2 is a three-dimensional view of a camera module (a lens barrel is shown in perspective) according to an embodiment of the present invention. FIG. 3 is a three-dimensional view of a heating module according to an embodiment of the present invention. FIG. 4 is a cross-sectional view of a camera module according to an embodiment of the present invention. As shown in FIGS. 1 to 4, the camera module includes a lens barrel 110, a front housing 120, a circuit board 130, a lens module 140 and a heating module 150.

As shown in FIGS. 1, 2 and 4, the lens barrel 110 has a first portion 112 and a second portion 114 connected to the first portion 112. The first portion 112 is partially exposed to the outside, and the second portion 114 is covered by the front housing 120. In some embodiments, a width of the first portion 112 is greater than a width of the second portion 114.

As shown in FIG. 4, the front housing 120 is configured to accommodate the second portion 114 of the lens barrel 110. In some embodiments, a front end of the front housing 120 is adjacent to a rear end of the first portion 112 of the lens barrel 110.

As shown in FIG. 4, the circuit board 130 is adjacent to the front housing 120. In some embodiments, the circuit board 130 is adjacent to a rear end of the front housing 120. The circuit board 130 has a control element 132. In some embodiments, the control element 132 is a microcontroller unit (MCU). In some embodiments, the control element 132 is disposed on a surface of the circuit board 130 away from the lens module 140. In some embodiments, the circuit board 130 further has an image sensor 134, such as a CMOS image sensor. In some embodiments, the image sensor 134 is disposed on a surface of the circuit board 130 close to the lens module 140.

As shown in FIGS. 1, 2 and 4, the lens module 140 is disposed in the lens barrel 110. In some embodiments, the lens module 140 has a plurality of lenses (not shown). The lens module 140 has a front lens 142.

As shown in FIGS. 1 to 4, the heating module 150 is disposed in the lens barrel 110. The heating module 150 includes an electrical connector 152, a heating element 154 and a temperature sensor 156.

The electrical connector 152 is disposed in the first portion 112 of the lens barrel 110, and is covered by the front housing 120, and is electrically connected to the control element 132 of the circuit board 130. In some embodiments, the circuit board 130 has a socket 136, and an end of the electrical connector 152 is inserted into the socket 136, and the socket 136 is electrically connected to the control element 132. In some embodiments, the socket 136 is disposed on the surface of the circuit board 130 away from the lens module 140.

In some embodiments, as shown in FIG. 4, the first portion 112 of the lens barrel 110 has a first through hole 112a, and the electrical connector 152 passes through the first through hole 112a. In some embodiments, as shown in FIG. 4, the front housing 120 has a second through hole 120a, and the electrical connector 152 passes through the second through hole 120a. In some embodiments, as shown in FIG. 4, the circuit board 130 has a third through hole 130a, and the electrical connector 152 passes through the third through hole 130a and is inserted into the socket 136 to electrically connect the control element 132 of the circuit board 130. In some embodiments, the electrical connector 152 is a flexible circuit board (FPC). However, the present invention is not limited to the foregoing embodiments. In other embodiments, the electrical connector 152 may be a flat cable or another suitable electrical connector.

The heating element 154 is in contact with the front lens 142 of the lens module 140, and is electrically connected to the control element 132 of the circuit board 130 through the electrical connector 152. In some embodiments, the heating element 154 is an electric heating circuit. In some embodiments, as shown in FIG. 3, the heating element 154 is a ring-shaped heating element. In some embodiments, the heating element 154 is disposed on a front surface 142a, a rear surface 142b and/or a side surface 142c of the front lens 142 of the lens module 140 and/or in a groove of the front lens 142 of the lens module 140 (not shown in FIGS. 1 to 4, please refer to a groove 142d shown in FIG. 5). In some embodiments, as shown in FIG. 4, the heating element 154 is disposed on the rear surface 142b of the front lens 142.

The temperature sensor 156 is close to the front lens 142 of the lens module 140, and is electrically connected to the control element 132 of the circuit board 130 through the electrical connector 152. The temperature sensor 156 is configured to measure the temperature near the front lens 142. In some embodiments, the temperature sensor is a thermistor, such as a negative temperature coefficient (NTC) thermistor.

For example, when the temperature sensed by the temperature sensor 156 is lower than a set temperature (also called a first set temperature, such as 0° C., −5° C., −10° C., −15° C., −20° C. or lower), the control element 132 automatically turns on the heating element 154 to achieve a defrosting/defogging effect. In some embodiments, when the control element 132 has turned on the heating element 154, and then the temperature sensed by the temperature sensor 156 is equal to or greater than a set temperature (also called a second set temperature, such as 20° C., 25° C., 30° C., 35° C., 40° C., 45° C., 50° C., 55° C., 60° C. or higher), the control element 132 automatically turns off the heating element 154.

In some embodiments, the camera module further includes a first sealing element 160, which is disposed between the first portion 112 of the lens barrel 110 and the front housing 120 to prevent moisture from penetrating into the interior of the camera module. In some embodiments, the camera module further includes a second sealing element 170, which is disposed between the front lens 140 and the first portion 112 of the lens barrel 110 to prevent moisture from penetrating into the interior of the camera module. The first sealing element 160 or the second sealing element 170 may be, for example, waterproof glue, an O-ring or another suitable sealing element. In some embodiments, the first sealing element 160 is waterproof glue, and the second sealing element 170 is an O-ring.

In some embodiments, the camera module further includes a support member 180 for supporting the heating member 154 and/or for separating the front lens 142 from the first portion 112 of the lens barrel 110 by a distance.

In some embodiments, the camera module further includes a lens cover 190 that covers an edge portion of the front lens 142 and a front end of the first portion 112 of the lens barrel 110.

In some embodiments, the camera module further includes a rear housing 210, and a front end of which is connected to the rear end of the front housing 120. In some embodiments, the camera module further includes another circuit board 220 that can be used for power management of the camera module. In some embodiments, the camera module further includes a connector 230 that can be used to connect to a host.

Figure 5:
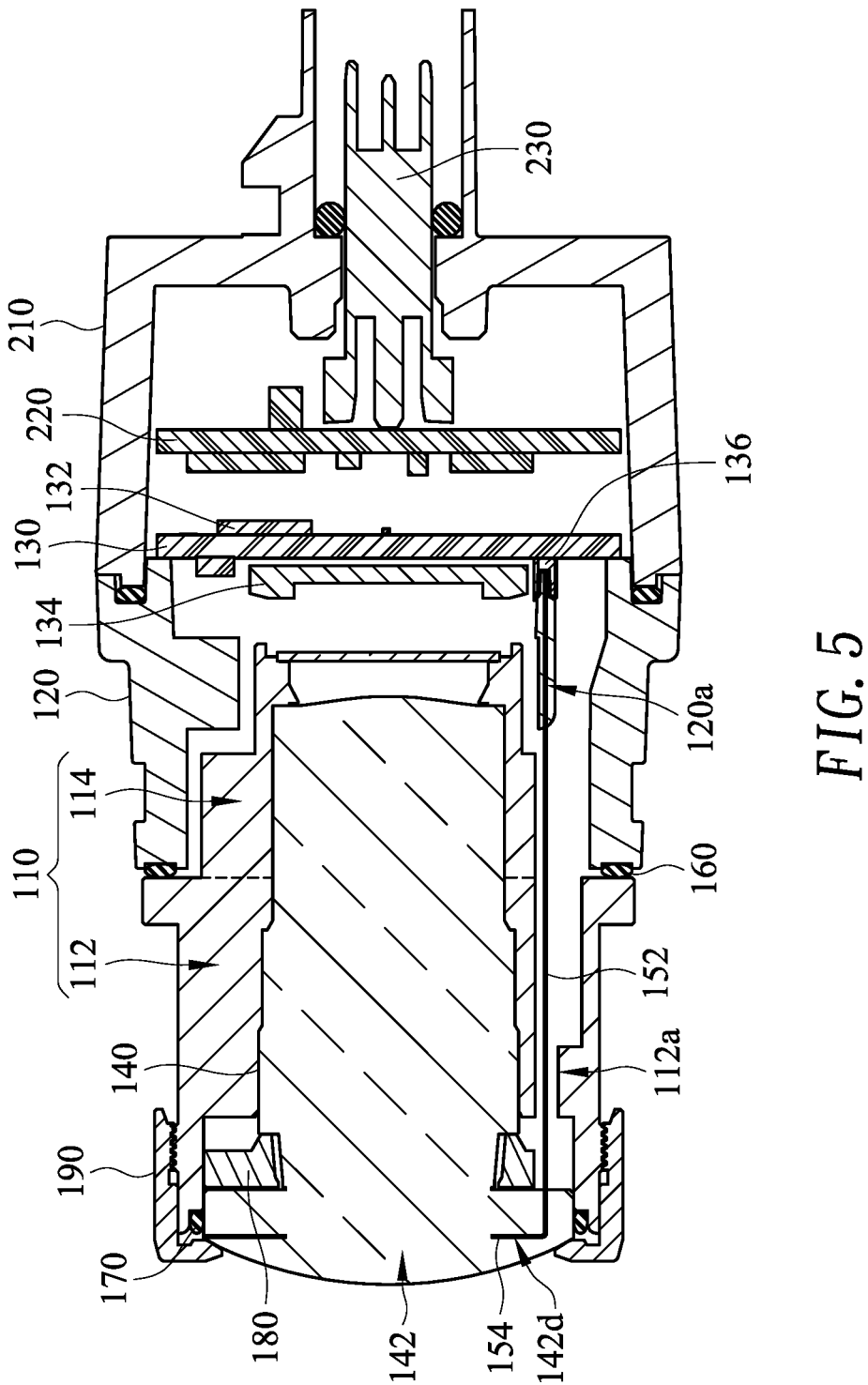
FIG. 5 is a cross-sectional view of a camera module according to an embodiment of the present invention.

FIG. 5 is a cross-sectional view of a camera module according to an embodiment of the present invention. The difference between the embodiment of FIG. 5 and the embodiment of FIG. 4 is that, as shown in FIG. 5, the heating element 154 is disposed in the groove 142d of the front lens 142 of the lens module 140; the socket 136 is disposed on the surface of the circuit board 130 close to the lens module 140; the circuit board 130 does not have the third through hole 130a as shown in FIG. 4, and the electrical connector 152 passes through the second through hole 120a and is inserted into the socket 136 to electrically connect the control element 132 of the circuit board 130.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A camera module, comprising:
a lens barrel, having a first portion and a second portion connected to the first portion, wherein the first portion of the lens barrel has a first through hole through the first portion;
a front housing, accommodating the second portion of the lens barrel, wherein the first portion of the lens barrel is disposed outside the front housing and has a rear surface abutting against a front surface of the front housing such that the first through hole directly communicates with an internal space defined between the second portion of the lens barrel and the front housing;
a circuit board, adjacent to the front housing and having a control element;
a lens module, disposed in the lens barrel and having a front lens; and
a heating module, disposed in the lens barrel, wherein the heating module comprises:

an electrical connector, disposed in the first portion of the lens barrel and extending through the first through hole of the first portion of the lens barrel and the internal space defined between the second portion of the lens barrel and the front housing, such that the electrical connector is not exposed to an outside of the first portion of the lens barrel and is electrically connected to the control element of the circuit board;
a heating element, in contact with the front lens of the lens module and electrically connected to the control element of the circuit board through the electrical connector; and
a temperature sensor, close to the front lens of the lens module and electrically connected to the control element of the circuit board through the electrical connector, wherein the temperature sensor is configured to measure a temperature close to the front lens, and the control element turns on the heating element when the temperature is lower than a set temperature.

2. The camera module of claim 1, wherein the front housing has a second through hole, and the electrical connector passes through the second through hole to electrically connect the control element of the circuit board.

3. The camera module of claim 1, wherein the control element is disposed on a surface of the circuit board away from the lens module, and the circuit board has a third through hole, and the electrical connector passes through the third through hole to electrically connect the control element of the circuit board.

4. The camera module of claim 1, wherein the control element is a microcontroller unit (MCU).

5. The camera module of claim 1, wherein the electrical connector is a flexible circuit board.

6. The camera module of claim 1, wherein the heating element is a ring-shaped heating element disposed on a front surface, a rear surface and/or a side surface of the front lens of the lens module and/or in a groove of the front lens of the lens module.

7. The camera module of claim 1, wherein the heating element is an electric heating circuit.

8. The camera module of claim 1, wherein the temperature sensor is a thermistor.

9. The camera module of claim 1, further comprising:
a first sealing element, disposed between the first portion of the lens barrel and the front housing.

10. The camera module of claim 9, wherein the electrical connector is between the lens barrel and the first sealing element.

* * * * *